April 11, 1961 J. S. ECKERT 2,979,314
PACKING TOWER WITH HOLD-DOWN PLATE
Filed Oct. 16, 1958 2 Sheets-Sheet 1

FIG. I

INVENTOR.
JOHN S. ECKERT
BY
ATTORNEY

April 11, 1961  J. S. ECKERT  2,979,314
PACKING TOWER WITH HOLD-DOWN PLATE
Filed Oct. 16, 1958  2 Sheets-Sheet 2

INVENTOR.
JOHN S. ECKERT
BY
ATTORNEY

United States Patent Office 2,979,314
Patented Apr. 11, 1961

2,979,314

PACKING TOWER WITH HOLD-DOWN PLATE

John S. Eckert, Silver Lake, Ohio, assignor to The United States Stoneware Company, Tallmadge, Ohio, a corporation of Ohio Filed Oct. 16, 1958, Ser. No. 767,541

1 Claim. (Cl. 261—94)

This invention relates to a tower for the countercurrent treatment of a gas and liquid or two immiscible liquids having therein an improved hold-down plate to rest on packing in the tower.

It is customary to provide a bed of packing elements in such a tower to produce large-surface contact between a liquid introduced into the top of the tower and a gas or another liquid introduced into the bottom of the tower. They flow countercurrent to one another in the bed to effect mass transfer and/or heat transfer from one to the other. At times, if the flow of the materials being treated is not uniform, local flooding may occur which tends to lift the packing elements at the top of the bed and displace them. Uniform results are obtained only if the depth of the bed of the packing elements is kept substantially constant. Therefore, it is advantageous to employ a hold-down plate which prevents such movement of the packing elements within the tower. Such a hold-down plate must comprise a large percentage of open area in order to provide minimum interference with the countercurrent flow of the materials being treated.

The hold-down plate of this invention is inert to the materials being treated. It is preferably cast from a ceramic composition; it may be machined from graphite; it may be formed of any suitable material. It is made in several parts which are tied together by threads, cords, twine or the like, which are inert to the materials being treated. For instance, these ties may be of glass, asbestos, graphite, metal alloy, plastic, etc.

By a "ceramic composition" reference is had to silicon oxide compositions containing other metallic or nonmetallic oxides which has been sintered by heat treatment.

In the preferred form of the invention, each part of the plate is formed of a long slender main arm provided with cross arms extending perpendicularly in opposite directions from this main arm, all of the cross arms extending from one side of said main arm being longer than those extending from the other side. When two such parts with straight arms are placed side-by-side, with all of the longer cross-arm portions on the first part touching the main arm of the second part, and the shorter cross-arm portions of the second part extending toward but not touching the main arm of the first part, openings are formed by the longer cross-arm portions and main arm which are quadrilateral, and the short cross arm portions of the second part extend into them, preferably substantially half way across them. This construction provides a maximum of open area in the plate without permitting substantial numbers of packing elements to pass through the plate.

The invention will be more particularly described in connection with a cylindrical tower through which gas flows upwardly and a liquid flows downwardly. In this connection reference is had to the accompanying drawings, in which—

Figure 1:
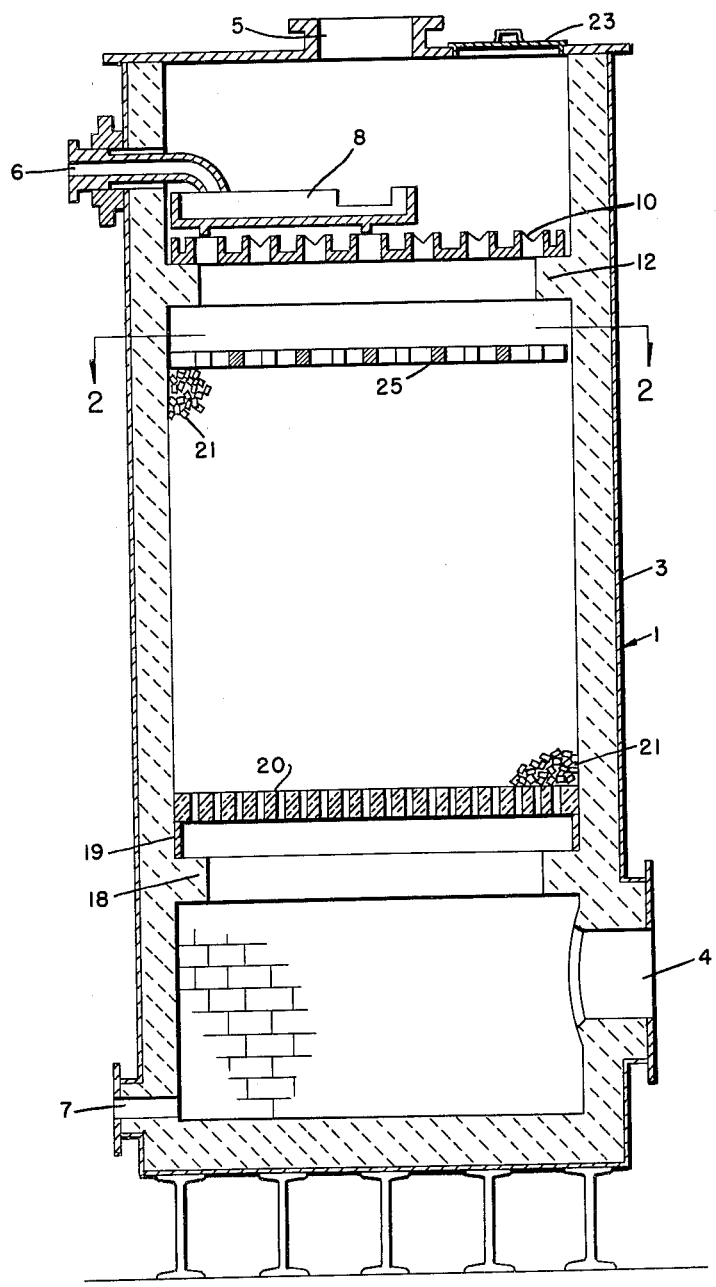
Fig. 1 is a section through a packed treating tower.
Figure 2:
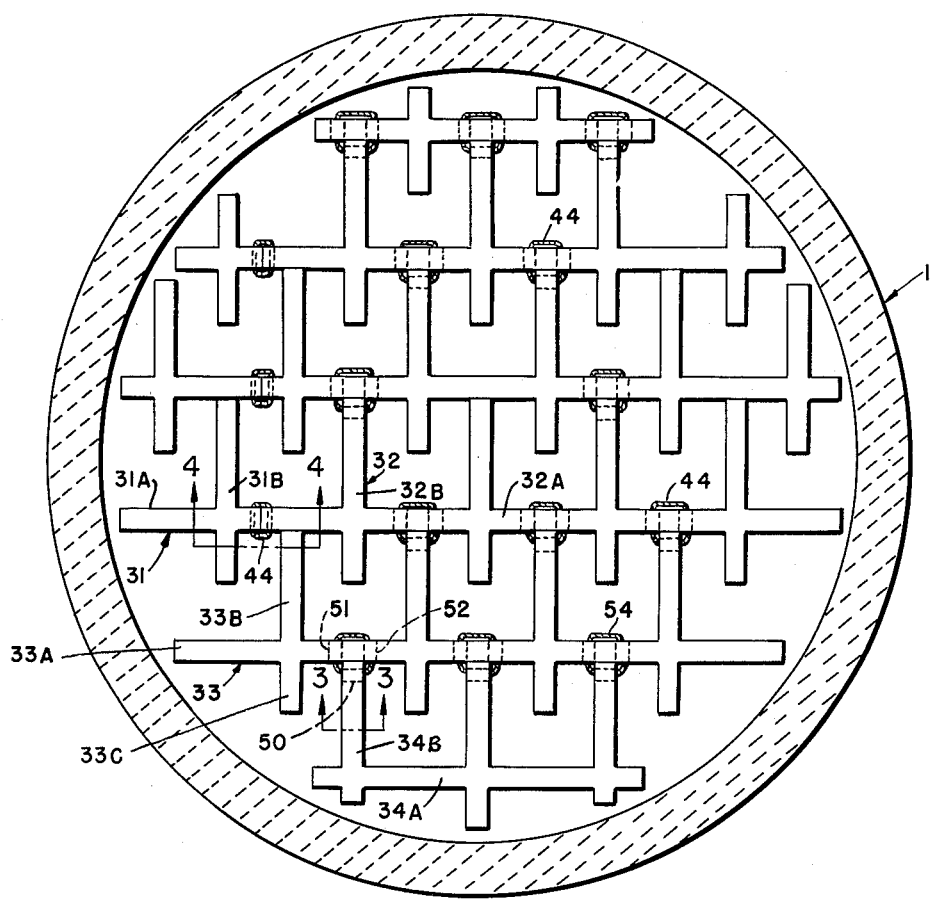
Fig. 2 is a plan view on the line 2—2 of Fig. 1.

The tower 1 of Fig. 1 may be of any suitable design. The tower illustrated has a lined steel shell 3 with a gas opening 4 near the bottom and a gas outlet 5 at the top. The liquid inlet 6 is near the top and the liquid outlet 7 is near the bottom. The liquid inlet delivers liquid into the distributor 8 which may be of any one of various designs. It rests on a suitable distributor 10 which in turn is supported by the shoulder 12 which is integral with the shell of the tower.

Just above the gas inlet 4 is the shoulder 18 on which is a circular supporting ring 19 (which is formed of several sections), on which rests the support plate 20 which may be of any usual design. The packing elements 21 may be rings, saddles, or the like, and may be composed of metal, plastic, or a ceramic material, etc. There is a manway 23 at the top of the tower.

The hold-down plate 25 is made of several ceramic parts all of which may be formed in the same mold. They are cut to size and tied together. Each part is composed of a long slender straight main arm (designated A herein) and cross arms extending outwardly from the main arm, opposite one another. All of the longer cross-arms (designated B) are on one side of arm A, all of the shorter cross arms (designated C) being on the other side. In assembling these parts to form the hold-down plate, all of the cross arms B of the different parts of the plate extend in one direction and all of the cross arms C extend in the other direction.

As formed, each part has four or five or more pairs of cross arms, and its length can be reduced as required by sawing off some of the main arm. One or more of the cross arms can be shortened as required around the edge of the hold-down plate.

Where it is necessary to tie two main arms end to end, holes are drilled through each, near the ends that are to be tied, and then a thread, preferably formed of a plurality of fine glass filaments, is sewed through these one or more times and tied tight. Where two parts are to be fastened together side-by-side, one or more of the cross arms of the one part are drilled and ties are passed through these and holes drilled in the main arm of the other part, and the parts are thus tied tight together.

To illustrate: To tie parts 31 and 32 together end-to-end, two holes 40, 41 are drilled through one end of main arm 31A, and two holes 42, 43 are drilled through one end of main arm 32A. The ends of the main arms are shaped (preferably flat) so that they fit flush against one another. Then threads (cords, twines, swatches or the like) 44 and 45 are threaded through each pair of holes one or more times and tied tight. This brings the two parts into alignment.

Figures 3, 4:
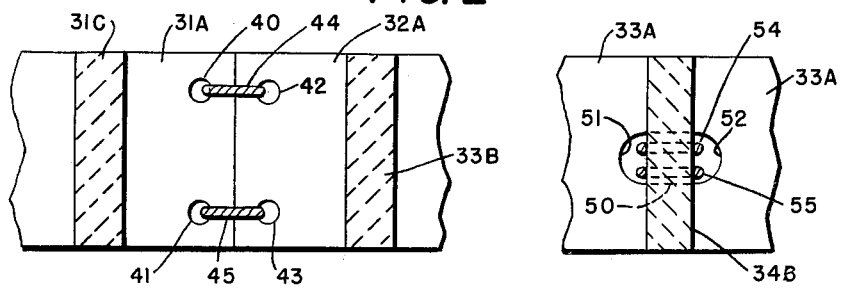
Fig. 3 is a section on the line 3—3 of Fig. 2.
Fig. 4 is a section on the line 4—4 of Fig. 2.

To tie two parts side-by-side a somewhat different procedure is followed, and it will be described more particularly in connection with tying cross arm B of part 34 to part 33. A different sort of tie is illustrated here where only one hole is drilled in each member and two different threads are passed through the holes and tied separately. The hole 50 is made through the end of arm 34B and holes 51 and 52 are made through the main arm 33A. These arms may be tied together in any suitable fashion, as with the two separate threads 54 and 55 (Fig. 3). The end of the arm 34B is flat and at right angles to the main direction of this arm, and the area of the main arm 33A with which it is brought in contact is flat and perpendicular (or if the main arm is rounded the end of the cross arm is rounded to fit it). A tight tie tends to make a rigid structure. The cross arms C of the part 33 must be so short as not to interfere with drawing the tied arms into tight contact. The cross arms C are too short to reach any main arm A. They reduce the largest dimension of the respective openings so that only smaller objects can be passed through them.

Around the edge of the hold-down plate, the arms are shortened as required to form a generally circular plate. They preferably do not touch the wall of the tower, although one or two arms may be allowed to extend outwardly beyond the others to assist in centering the plate in the tower.

The different parts are preferably brought separately into the tower and assembled there. The cross arms of the different parts may be made so short that each part can be passed in and out of a manway 23.

Although in the preferred arrangement, the cross arms are opposite one another and one is longer than the other, this is not necessary. Furthermore, the ratio of the number of the longer cross arms to the shorter cross arms need not be 1:1. The openings formed by the main arms and cross arms may be so small that it is not necessary for short cross arms to extend into them. Cross arms which do not extend across the opening prevent the passage therethrough of packing elements which would pass through an unobstructed opening.

The open area of the hold-down plate is at least 50 percent of its entire area. Many modifications may be made in the construction disclosed without departing from the invention.

The invention is covered in the claim which follows.

What I claim is:

In a packed treating tower which has a support plate therein, a bed of packing elements on the support plate, and a hold-down plate, the improvement which consists of a hold-down plate which is composed of a plurality of parts tied together, each part comprising a main arm with cross arms extending outwardly therefrom in the same plane, the main arms of the various parts being parallel to one another, all of the cross arm portions on one side of the main arms being shorter than the cross arm portions on the other side of the main arms, the longer and shorter arms being located directly opposite one another and spaced substantially uniformly along the main arm, the ends of the longer arms of a first part abutting the main arm of an adjacent part and forming a substantially open parallelogram therewith, a short arm of said adjacent part projecting only part way across said opening and thereby reducing the size of an object that can be passed therethrough, with the hold-down plate resting on the bed and the size of the openings constituting at least 50 percent of the area of the hold-down plate and with the openings so small as to prevent substantial displacement of the packing elements on the top of the bed and prevent substantial numbers thereof to pass through the plate during local flooding on the top of the bed.

References Cited in the file of this patent

UNITED STATES PATENTS

| 172,574 | Mathias | Jan. 25, 1876 |
| 1,914,573 | Kookogey | June 20, 1933 |
| 1,947,777 | Huff et al. | Feb. 20, 1934 |
| 2,283,307 | Barry et al. | May 19, 1942 |

FOREIGN PATENTS

| 27,968 | Great Britain | 1903 |
| 335,803 | France | Dec. 16, 1903 |